UNITED STATES PATENT OFFICE.

CHARLES B. DUDLEY, OF ALTOONA, PENNSYLVANIA.

PROCESS OF PURIFYING WATER.

SPECIFICATION forming part of Letters Patent No. 291,167, dated January 1, 1884.

Application filed August 25, 1883. (No specimens.)

*To all whom it may concern:*

Be it known that I, CHARLES B. DUDLEY, of Altoona, county of Blair, and State of Pennsylvania, have invented new and useful Improvements in the Art of Purifying Water; and I do hereby declare that the following is a full and exact description of the same.

This discovery relates to a modification of the method of purifying water by the use of soda-lime, as set forth in my patent of August 21, 1883, No. 283,472; and it consists in treating the water with caustic baryta in addition to the soda-lime, the whole process being in one operation, as will be fully described hereinafter.

In the practice of the method described in my patent before referred to, it is found in purifying certain waters that so large an amount of sulphates, principally sulphates of soda and sulphate of magnesia, is left in the water that their presence becomes objectionable; and the object of the method described in this application is to remove from the water the sulphuric acid in those sulphates, and such other mineral matter as may be precipitated by caustic baryta. In treating these waters, the method described in the patent referred to is exactly carried out until the completion of the agitation after the soda-lime has been added, when caustic baryta is then added in sufficient amount to combine with the sulphuric acid of the sulphates. Agitation is then continued sufficiently long to cause the necessary reactions to take place. The water is then allowed to stand until it becomes clear, when it is ready for use.

In the practical application of the above-described method it may be necessary, in certain cases, to modify the constitution of the soda-lime used as described in the patent previously referred to—that is to say, when the sulphuric acid is to be removed, it will not be necessary to have the soda-lime contain enough soda to combine with the total sulphuric acid and chlorine in the water, but only enough to combine with the sulphuric acid and chlorine which in the original waters were combined with the lime. If a soda-lime is used, however, which leaves carbonate of soda in the water, it will be necessary to add enough more caustic baryta to combine with this carbonic acid. The chemical reactions which take place as the result of the addition of the caustic baryta, as above described, are probably as follows: The water may contain the following salts which may be concerned in the reaction: namely, sulphate of soda, sulphate of magnesia, and carbonate of soda. By the reaction, sulphate of baryta, carbonate of baryta, hydrate of soda, and hydrate of magnesia will be formed. The baryta salts and the hydrate of magnesia will be precipitated and the hydrate of soda will remain in the solution. If chloride of magnesia has not been previously precipitated, its magnesia will now be precipitated by means of the caustic soda. The result of the whole operation will be that nearly all the mineral impurities occuring in the water, including the sulphuric acid, will be removed from it.

Having thus fully described my discovery, what I claim as new, and desire to secure by Letters Patent, is—

The herein-described method of purifying waters for boiler use, consisting in treating the water with caustic baryta in addition to the soda-lime, the whole process being in one operation, substantially as set forth.

CHAS. B. DUDLEY.

Witnesses:
THEODORE S. WEST,
WM. T. EMERSON.